United States Patent
Noraker

(10) Patent No.: US 7,380,365 B2
(45) Date of Patent: Jun. 3, 2008

(54) DIVER WITH SCENT CHAMBER

(75) Inventor: Alan G. Noraker, Aurora, CO (US)

(73) Assignee: Wright & McGill Co., Denver, CO (US)

( * ) Notice: Subject to any disclaimer, the term of this patent is extended or adjusted under 35 U.S.C. 154(b) by 0 days.

(21) Appl. No.: 11/549,476

(22) Filed: Oct. 13, 2006

(65) Prior Publication Data

US 2008/0086929 A1    Apr. 17, 2008

(51) Int. Cl.
*A01K 85/01*    (2006.01)
*A01K 91/08*    (2006.01)

(52) U.S. Cl. .................................... 43/42.06; 43/43.13
(58) Field of Classification Search .............. 43/42.06, 43/44.99, 43.13, 43.12
See application file for complete search history.

(56) References Cited

U.S. PATENT DOCUMENTS

| | | | | |
|---|---|---|---|---|
| 676,521 | A * | 6/1901 | Weiss | 43/42.19 |
| 1,353,779 | A * | 9/1920 | Moore | 43/42.19 |
| 1,467,116 | A * | 9/1923 | Reekers | 43/42.19 |
| 1,530,343 | A * | 3/1925 | Bayer | 43/42.2 |
| 1,913,362 | A * | 6/1933 | Catarau | 43/42.06 |
| 2,205,472 | A * | 6/1940 | Fagerholm | 43/42.52 |
| 2,302,206 | A * | 11/1942 | Gibson et al. | 43/41 |
| 2,487,344 | A * | 11/1949 | Lambert | 43/41 |
| 2,541,397 | A * | 2/1951 | Wisener et al. | 43/42.19 |
| 2,545,185 | A * | 3/1951 | Winslow | 43/43.13 |
| 2,566,029 | A * | 8/1951 | Louthan | 43/43.13 |
| 2,572,721 | A * | 10/1951 | Hatt | 43/42.19 |
| 2,603,024 | A * | 7/1952 | Pollard | 43/42.19 |
| 2,679,227 | A * | 5/1954 | Symonds | 43/42.22 |
| 2,716,832 | A * | 9/1955 | Minnie, III | 43/43.13 |
| 2,731,755 | A * | 1/1956 | Ward et al. | 43/43.13 |
| 2,740,224 | A * | 4/1956 | Heiderich | 43/41 |
| 2,741,863 | A * | 4/1956 | Magill | 43/43.13 |
| 2,745,206 | A * | 5/1956 | Wilson | 43/42.06 |
| 2,749,647 | A * | 6/1956 | Beloff | 43/42.06 |
| 2,786,296 | A * | 3/1957 | Loebensteen | 43/43.12 |
| 2,791,058 | A * | 5/1957 | Bettini | 43/42.06 |
| 2,797,520 | A * | 7/1957 | Nycz et al. | 43/42.12 |

(Continued)

FOREIGN PATENT DOCUMENTS

EP        1103179 A2 *    5/2001

(Continued)

OTHER PUBLICATIONS

Fishing Products- Drivers, internet site for Luhr Jensen, downloaded on Sep. 5, 2006, 2 pages.

(Continued)

*Primary Examiner*—Darren W Ark
(74) *Attorney, Agent, or Firm*—Sheridan Ross P.C.

(57)    ABSTRACT

A method and apparatus for creating a plume of fish attractant around a submerged lure moving relative to the water are provided. In particular, a diver is provided that includes a structure for receiving a fish attracting substance. The structure for receiving the fish attracting substance is configured so that a plume of the fish attracting substance is directed around a lure connected to the diver while the diver and hire are submerged in and moving relative to the water. A cap for enclosing the structure for receiving the fish attracting substance may be provided for containing the substance while the diver is out of the water.

16 Claims, 8 Drawing Sheets

U.S. PATENT DOCUMENTS

| | | | |
|---|---|---|---|
| 2,836,001 A * | 5/1958 | Silen | 43/42.06 |
| 2,844,907 A * | 7/1958 | Merton | 43/44.99 |
| 2,933,848 A * | 4/1960 | Tollefson | 43/43.13 |
| 2,952,092 A * | 9/1960 | Swenson | 43/42.06 |
| 2,976,642 A * | 3/1961 | Wickman et al. | 43/43.13 |
| 2,983,065 A * | 5/1961 | Ferguson et al. | 43/42.06 |
| 2,994,622 A * | 8/1961 | Miller | 43/43.12 |
| 3,032,912 A * | 5/1962 | Bengtsson | 43/43.13 |
| 3,044,208 A * | 7/1962 | Minera | 43/43.13 |
| 3,095,664 A * | 7/1963 | Nichols | 43/43.13 |
| 3,134,189 A * | 5/1964 | Hubbart | 43/43.13 |
| 3,163,958 A * | 1/1965 | Quinn | 43/42.06 |
| 3,216,147 A * | 11/1965 | Minera | 43/43.13 |
| 3,318,038 A * | 5/1967 | Jacques | 43/43.13 |
| 3,391,482 A * | 7/1968 | Benoit | 43/43.12 |
| 3,401,477 A * | 9/1968 | Luketa | 43/43.13 |
| 3,401,483 A * | 9/1968 | Bellah et al. | 43/43.13 |
| 3,453,768 A * | 7/1969 | Feaster et al. | 43/42.06 |
| 3,464,142 A * | 9/1969 | Hubbart | 43/43.13 |
| 3,466,787 A * | 9/1969 | Collins | 43/43.13 |
| 3,470,649 A * | 10/1969 | Cole | 43/43.13 |
| 3,568,355 A * | 3/1971 | Hassell | 43/43.13 |
| 3,613,290 A * | 10/1971 | Louthan | 43/43.13 |
| 3,648,398 A * | 3/1972 | Newell | 43/43.12 |
| 3,693,275 A * | 9/1972 | Craig | 43/42.06 |
| 3,748,772 A * | 7/1973 | Gravitt | 43/41 |
| 3,749,045 A * | 7/1973 | Angus et al. | 114/245 |
| 3,796,000 A * | 3/1974 | Nye | 43/43.13 |
| 3,800,458 A * | 4/1974 | Swanby | 43/43.12 |
| 3,818,624 A * | 6/1974 | Duffy | 43/43.13 |
| 3,835,573 A * | 9/1974 | Borchardt | 43/43.12 |
| 3,844,059 A * | 10/1974 | Weber | 43/43.13 |
| 3,874,109 A * | 4/1975 | Peterson | 43/42.22 |
| 3,897,648 A * | 8/1975 | Neary | 43/43.13 |
| 3,898,759 A * | 8/1975 | Jensen | 43/43.13 |
| 3,940,872 A * | 3/1976 | Weber | 43/43.13 |
| 3,943,653 A * | 3/1976 | Reckler | 43/43.13 |
| 3,978,811 A * | 9/1976 | Angus et al. | 43/43.13 |
| 3,983,655 A * | 10/1976 | Kolesar | 43/42.19 |
| 4,047,317 A * | 9/1977 | Pfister | 43/42.06 |
| 4,065,869 A * | 1/1978 | Berry | 43/43.12 |
| 4,133,134 A * | 1/1979 | Cheng | 43/42.06 |
| 4,161,078 A * | 7/1979 | Pagani | 43/43.13 |
| 4,161,841 A * | 7/1979 | Holstein | 43/43.13 |
| 4,232,471 A * | 11/1980 | Kolk et al. | 43/44.99 |
| 4,254,573 A * | 3/1981 | Mastropaolo | 43/43.13 |
| 4,255,890 A * | 3/1981 | Smith | 43/43.12 |
| 4,267,658 A * | 5/1981 | Brown et al. | 43/42.06 |
| 4,477,996 A * | 10/1984 | Walter | 43/42.06 |
| 4,486,970 A * | 12/1984 | Larson | 43/43.13 |
| 4,553,348 A * | 11/1985 | Cooper | 43/42.06 |
| 4,567,687 A * | 2/1986 | Even et al. | 43/43.13 |
| 4,745,702 A * | 5/1988 | Koch | 43/43.13 |
| 4,823,497 A * | 4/1989 | Pierce | 43/42.06 |
| 4,876,820 A * | 10/1989 | Vann | 43/43.13 |
| 4,903,428 A * | 2/1990 | Sluiter et al. | 43/43.13 |
| 4,922,648 A * | 5/1990 | Louthan | 43/43.13 |
| 4,941,281 A * | 7/1990 | Vitale et al. | 43/43.12 |
| 4,951,413 A * | 8/1990 | Blevins et al. | 43/43.13 |
| 4,962,609 A * | 10/1990 | Walker | 43/42.06 |
| 5,018,296 A * | 5/1991 | Putz, II | 43/43.12 |
| 5,117,577 A * | 6/1992 | Burghoff | 43/44.99 |
| 5,193,300 A * | 3/1993 | Johnson | 43/43.13 |
| 5,299,378 A * | 4/1994 | Ballard | 43/42.06 |
| 5,355,615 A * | 10/1994 | Spickelmire | 43/43.13 |
| 5,375,366 A * | 12/1994 | Johnson | 43/43.13 |
| 5,417,008 A * | 5/1995 | Smith | 43/43.12 |
| 5,461,821 A * | 10/1995 | Carter, Jr. | 43/43.12 |
| 5,615,513 A * | 4/1997 | Luna | 43/43.13 |
| 6,192,617 B1 * | 2/2001 | Lyles | 43/42.06 |
| 6,393,756 B1 * | 5/2002 | Forney et al. | 43/42.06 |
| 6,408,565 B1 * | 6/2002 | Duncan | 43/42.06 |
| 6,427,375 B1 * | 8/2002 | Hair et al. | 43/42.06 |
| 6,453,600 B1 * | 9/2002 | Craig | 43/43.13 |
| 6,523,297 B1 * | 2/2003 | Hair et al. | 43/42.2 |
| 6,640,487 B2 * | 11/2003 | Angwin | 43/43.12 |
| 6,658,784 B1 * | 12/2003 | Mastropaolo | 43/43.13 |
| 6,668,482 B1 * | 12/2003 | Ruffin et al. | 43/42.06 |
| 2002/0069576 A1* | 6/2002 | Craig | 43/44.87 |
| 2006/0000138 A1* | 1/2006 | Druk | 43/42.06 |
| 2006/0005456 A1* | 1/2006 | Harris et al. | 43/42.06 |
| 2006/0005457 A1* | 1/2006 | Harris et al. | 43/42.06 |
| 2006/0174537 A1* | 8/2006 | Woodham et al. | 43/44.99 |
| 2006/0213113 A1* | 9/2006 | Emory | 43/43.13 |

FOREIGN PATENT DOCUMENTS

| | | | |
|---|---|---|---|
| GB | 2418582 A | * | 4/2006 |
| JP | 10-23848 A | * | 1/1998 |
| JP | 11-137124 A | * | 5/1999 |
| JP | 2002-131 A | * | 1/2002 |
| JP | 2003-61529 A | * | 3/2003 |
| JP | 2004-222707 A | * | 8/2004 |
| JP | 2005-224229 A | * | 8/2005 |

OTHER PUBLICATIONS

Tech Report #2, How to Effectively Use the Revolutionary Hot Shot Side Planer in Rivers (Revised), May 10, 2002; Luhr Jensen & Sons, Inc., 2 pages, U.S.A.

Tech Report #4, A Complete Guide on How to Effectively Use Diver/Bait Backtrolling Techniques in Rivers (Revised), Mar. 2, 2004; Luhr Jensen & Sons, Inc., 2 pages, U.S.A.

Tech Report #12, A Complete Guide on How to Effectively Troll The Directional Dipsy Diver (Revised), Jun. 10, 2002; Luhr Jensen & Sons, Inc., 2 pages, U.S.A.

* cited by examiner

DIVER WITH SCENT CHAMBER

FIELD

The present invention relates to a diver having a scent chamber for use in combination with a fishing lure.

BACKGROUND

It is often desirable while fishing to present a fishing lure at some depth beneath the surface of the water. In order to submerge a lure, devices known as trolling planers or divers have been developed. In general, such devices submerge an interconnected lure using the force of water moving relative to the diver. More particularly, divers typically have a wing or plane having a leading edge that is lower than the following edge, such that the force of water on the plane or wing causes the diver and the attached lure to be forced downward. The ultimate depth achieved by the diver is a function of the diver's size, the speed of the water relative to the diver, line diameter, size of bait or lure, and the amount of line between the rod tip and the diver. Accordingly, divers can be used when fishing from a moving boat, or from shore when fishing into a moving current.

In order to enhance the effectiveness of the hire, fish-attracting substances have been developed. These substances produce a scent that is attractive to fish. In general, fish-attracting substances are used by placing the substance on the lure itself. However, fish-attracting substances are often unpleasant for the fisherman to handle, and can foul fishing lines. In addition, fish-attracting substances need to be reapplied frequently to the lure. In addition, once a scent has been applied to a lure, using a new scent effectively can require using a different lure with the new scent, unless the scent previously applied to the lure has been worn off.

SUMMARY

The present invention is directed to solving these and other problems and disadvantages of the prior art. In accordance with embodiments of the present invention, a diver incorporating a scent chamber is provided. The diver is rigged relative to the lure such that the water moving relative to the diver and the lure carries a plume of scent from the scent chamber around the lure. In accordance with embodiments of the present invention, the scent chamber includes an inlet connected to an outlet by a central bore. Within the central bore is a structure for holding a fish attractant. The structure may include a surface to which a fish-attracting substance may be applied. The structure may also include an absorbent material, such as a sponge, capable of absorbing a quantity of fish attractant.

In accordance with further embodiments of the present invention, the scent chamber includes lateral ports to facilitate loading of the scent chamber with fish attractant. In addition, the structure for holding fish attractant can be removed by the user and replaced, for example to facilitate the use of different fish attractants or scents. Embodiments of the present invention may also include a spinner for producing a trail of bubbles as an additional means for attracting fish to the lure.

In accordance with embodiments of the present invention, a method of fishing is provided according to which a lure is interconnected to a diver. The diver is provided with a fish attractant. The interconnection between the diver and the lure is such that the diver is held below and in front of the lure when the rig is placed in water moving relative to the rig. Scent from the fish attractant placed on the diver is released as a plume that encompasses or passes around the trailing lure. Accordingly, the ability to attract fish to the lure can be enhanced as compared to use of a diver that is not provided with a fish-attracting substance.

Additional features and advantages of embodiments of the present invention will become more readily apparent from the following discussion, particularly when taken together with the accompanying drawings.

DETAILED DESCRIPTION

Figure 1:
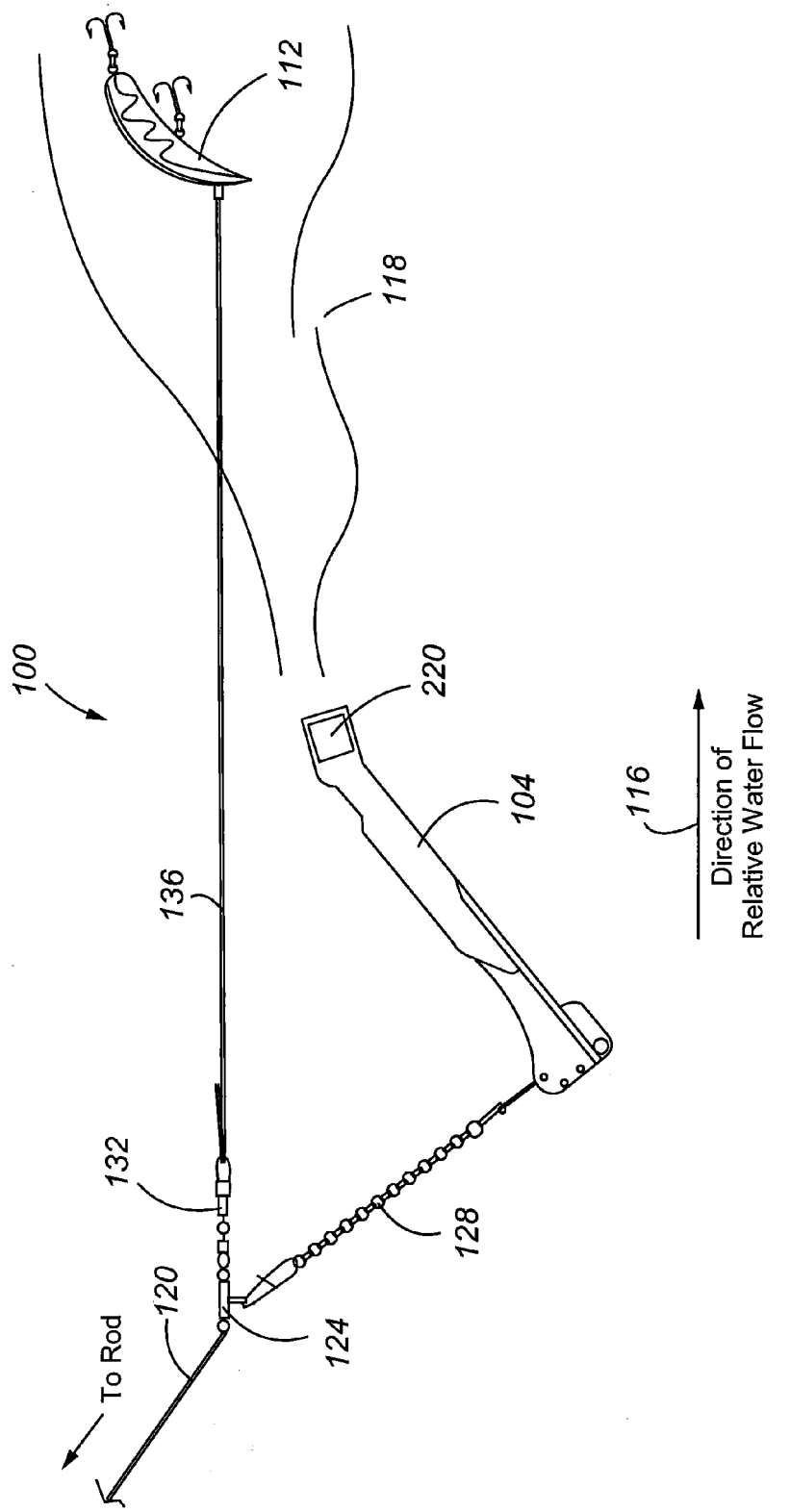
FIG. 1 depicts a rig comprising a diver having a scent chamber in accordance with embodiments of the present invention and a lure in water moving relative to the rig.

FIG. 1 depicts a fishing rig 100 using a diver 104 having a scent chamber 220 in accordance with embodiments of the present invention, in combination with a lure 112. More particularly, the rig 100 is shown as it might appear while submerged in a current flowing from left to right in the figure, as indicated by line 116, the direction of relative water flow. In particular, the diver 104 is held at an angle or attitude relative to the surface of the water that tends to pull the diver 104 and the hire 112 away from the surface when water is moving relative to the diver 104. The scent chamber 220 is configured so that a plume 118 of scent or fish attractant flows from the scent chamber 220 and around or past the lure 112. In addition to the diver 104 and the lure 112, the rig 100 includes a fishing line 120 that typically is connected to a rod and reel being used by a fisherman at the surface, for example on the bank of a river or on a moving boat. The fishing line 120 in the present example is passed through a slider 124 that is connected to the diver 104 by a bead chain 128. The fishing line is terminated in a barrel swivel 132 to which the lure 112 is attached by a length of leader 136. As can be appreciated by one of skill in the art, the particular materials and interconnecting components used to attach the diver 104 and the lure 112 to the fishing line 120 can be varied, so long as the diver 104 and hire 112 are held in moving water relative to one another, such that the diver 104 is ahead of the lure 112 (with reference to the direction of water flow 116), and with the diver 104 at a greater depth than the lure 112, as generally depicted in FIG. 1.

Figure 2:
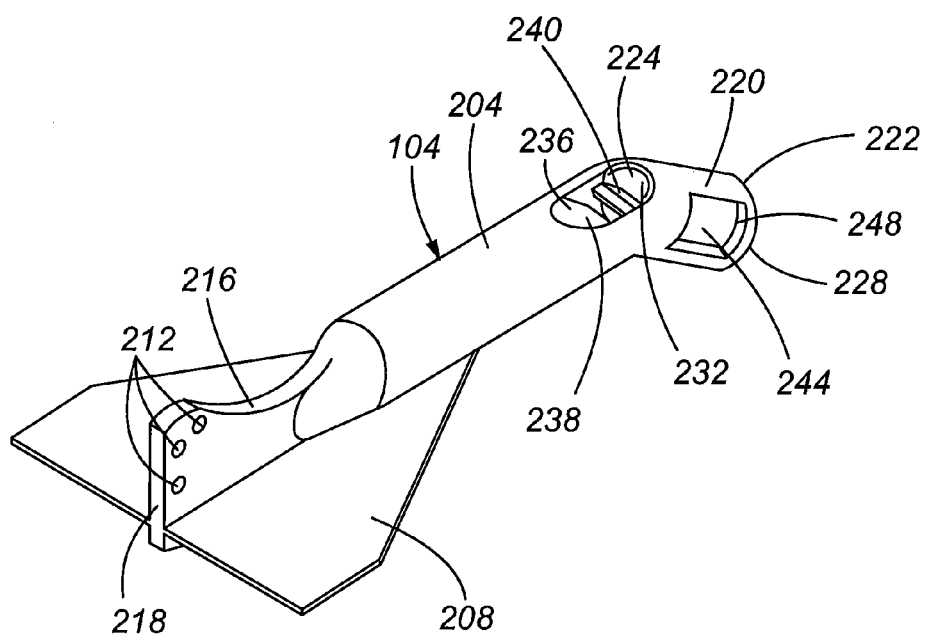
FIG. 2 is a perspective view of a diver incorporating a scent chamber in accordance with embodiments of the present invention.

In FIG. 2, a diver 104 in accordance with embodiments of the present invention is shown in a perspective view. In general, the diver 104 includes a buoyant body 204 that is interconnected to a plane or wing 208. In addition, the diver 104 includes one or more line attachment points 212 provided as part of a support structure or other means for attaching a fishing line 216 at a front end 218 of the diver 104. As shown, the support structure 216 may extend from a center line of the wing 208 and may define a plane that is perpendicular to a plane defined by the surface of the wing 208. The support structure 216 may also be directly interconnected to the buoyant body 204

At a tail end 222 of the diver 104, opposite from the front end 218 that is proximate to the line attachment points 212, is a scent chamber or structure, or means for receiving a fish-attracting substance 220. The scent chamber 220 includes an inlet 224 at a first end of the scent chamber and an outlet 228 at a second end of the scent chamber. Moreover, the scent chamber 220 can include a central bore 232 extending between the inlet 224 and the outlet 228. As shown, the end of the buoyant body 204 proximate to the scent chamber 220 may be tapered or angled along a surface 236 leading towards the inlet 224, to provide an open area 238 for allowing a relatively unimpeded flow of water to the scent chamber 220 when water is moving relative to the diver 104. Moreover, the open area 238 is configured so that the flow of water to the inlet 224 of the scent chamber 220 is relatively unimpeded when the diver is in its normal operating attitude, for example as illustrated in FIG. 1. A member 240 extending across the inlet 224 of the scent chamber 220 may be provided for interconnecting a fish-attractant-receiving structure 244. As shown in FIG. 2, the scent chamber 220 may additionally feature one or more lateral ports 248, to facilitate loading the structure for receiving a fish-attracting substance with fish attractant.

Figure 3:
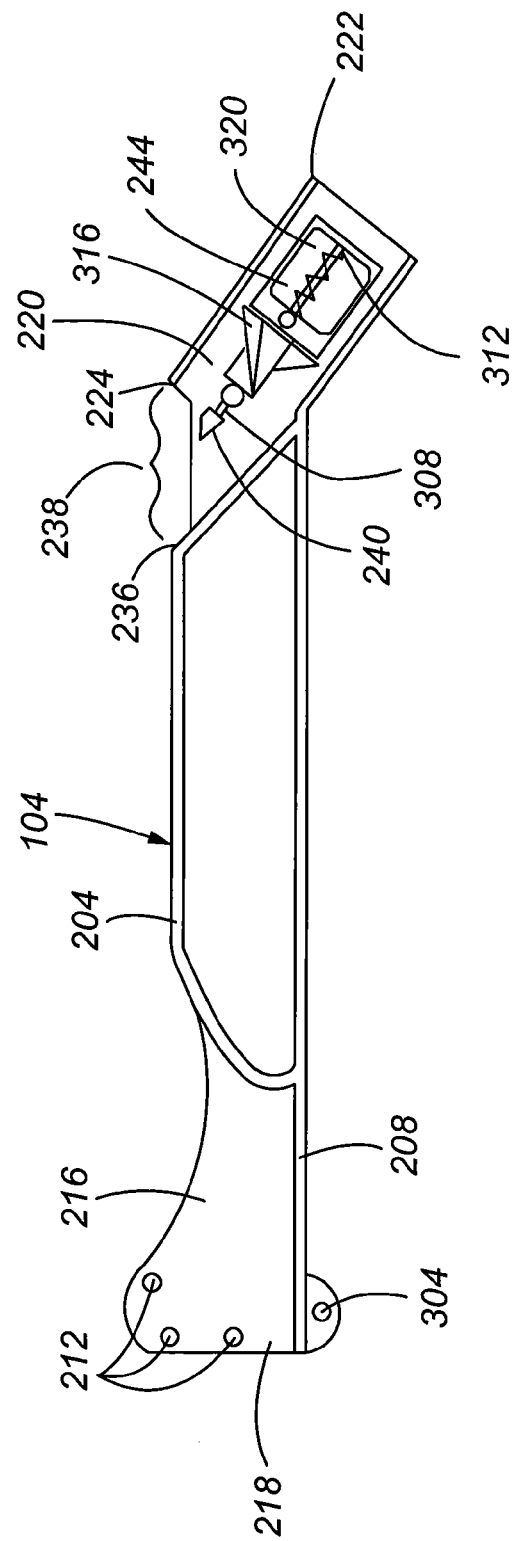
FIG. 3 is a side view showing the diver of FIG. 2 in cross-section.

FIG. 3 illustrates the diver 104 of FIG. 2 in side elevation along a cross-section taken along the center line of the diver 104. Visible in this view is a pencil weight 304, that may be provided to facilitate maintenance of the desired attitude of the diver 104 when in use. In addition, it can be seen that the buoyant body 204 may comprise a hollow structure. Also visible in FIG. 3 are components that may be included as part of the structure for receiving a fish attractant 244. In particular, the structure 244 may include a retaining pin 308 with a first end that is received by the member 240 that extends across the inlet 224 of the scent chamber 220. The retaining pin 308 may pass through or otherwise be associated with a biasing member 312, such as a compression spring, that locks the retaining pin 308 in place when the structure 244 is assembled. The retaining pin 308 may also carry a spinner 316. In general, the spinner 316 may comprise a helical or propeller-shaped structure that spins when water moves past the diver 104, creating a trail of bubbles that can assist in attracting fish to a trailing lure 112. In addition, the structure 244 may include an absorbent member 320, such as a sponge, for receiving liquid fish attractant and releasing the fish attractant as water moves relative to the diver 104, creating a plume 118 that can encompass a trailing lure 112.

Figure 4:
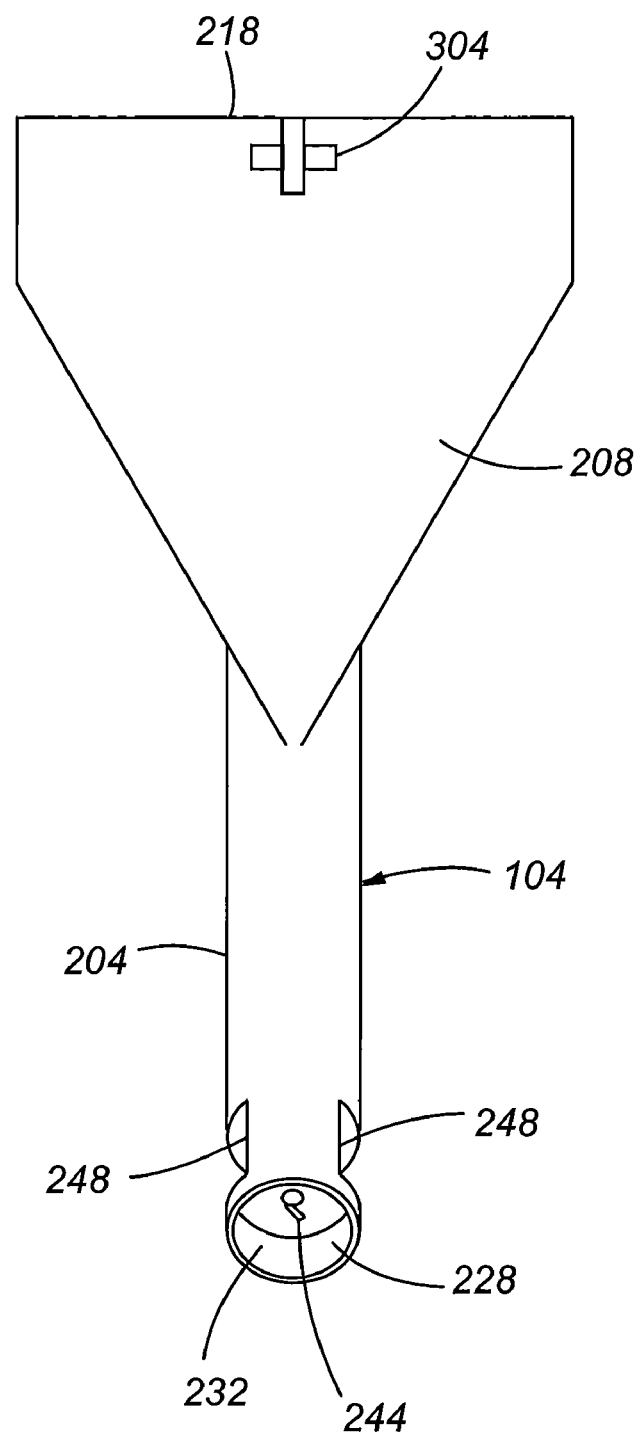
FIG. 4 is a bottom view of the diver of FIG. 2.
Figure 5:
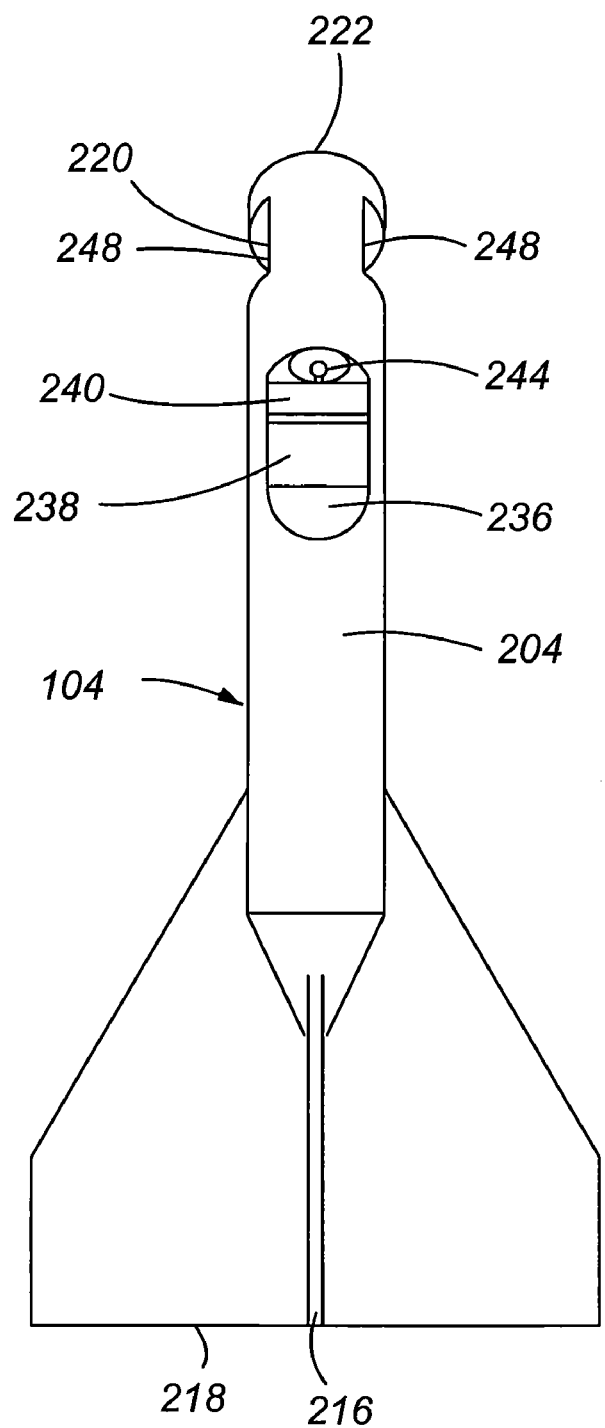
FIG. 5 is a top view of the diver of FIG. 2.

FIG. 4 is a bottom view, and FIG. 5 is a top view, of the diver 104 of FIG. 2. In particular, FIG. 4 illustrates that the body 204 may extend for some distance past the end of the plane 208, so that the scent chamber 220 is positioned away from the end of the plane 208. FIG. 5, in addition to illustrating other aspects of the diver 104, provides a view of the open area 238 leading to the inlet 224 of the scent chamber 220.

Figure 6:
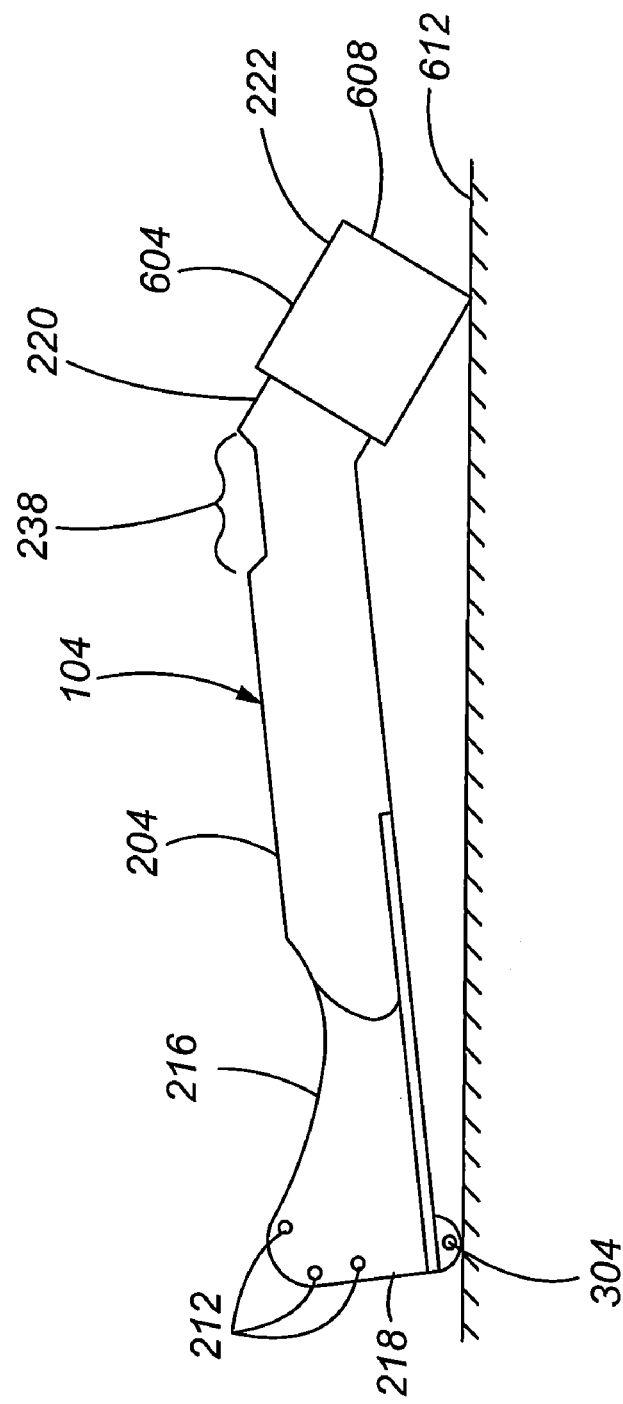
FIG. 6 is a side view of the diver of FIG. 2, with a scent chamber cap in place.

FIG. 6 is a side view of the diver of FIG. 2, with a scent chamber cap 604 in place. In particular, the scent chamber cap 604 is dimensioned to fit over at least the outlet 232 and lateral 248 ports of the scent chamber 220. By providing a scent chamber cap 604, liquid or petroleum based fish attractants placed in the scent chamber 220 can be prevented from leaking out of the diver 104. This is desirable, as fish attractants often have an unpleasant odor and are often difficult to clean up after spills. In the configuration illustrated in FIG. 6, it can be appreciated that, by placing the diver 104 such that the edge of the cap 604 at or near the end 608 of the cap 604 is against a support surface 612 and such that the bottom side (i.e. the side to which the pencil weight 304 is attached) of the plane is facing the support surface 612, fish attractant will be contained by the cap 604. In accordance with embodiments of the present invention, the scent chamber cap 604 is held in place by friction, and can be removed or put in place by a user as desired. In accordance with other embodiments of the present invention, a latch or other mechanism or structure may be provided to help hold the cap 604 on the scent chamber 220. As can be appreciated by one of skill in the art after consideration of the present disclosure, the cap 604 is generally removed for loading the scent chamber 220 with fish attractant and while the diver 104 is in the water.

Figure 7:
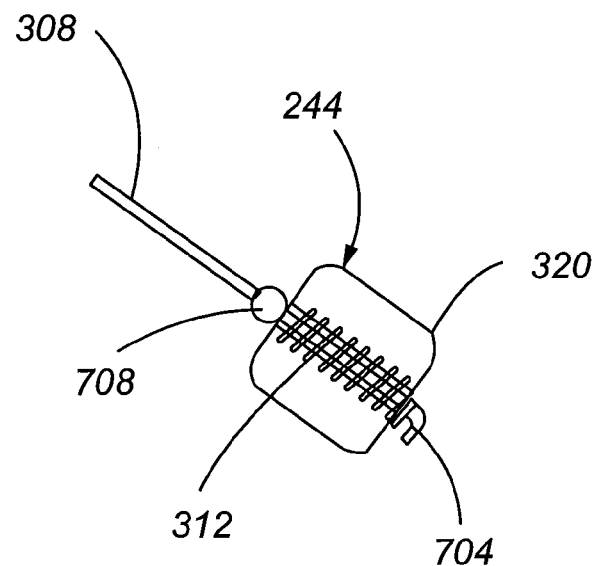
FIG. 7 is a cross-section of a fish attractant receiving structure 244 in accordance with embodiments of the present invention.

FIG. 7 is a cross-section of a fish attractant or scent receiving structure 244 in accordance with embodiments of the present invention. In general, the fish attractant receiving structure 244 may include a retaining pin 308 with a first end provided with a structural feature comprising a retainer structure 704 to interconnect the fish attractant receiving structure 244 to the member 240 extending across the inlet 224 of the scent chamber 220. For example, the retainer structure 704 may comprise a hook that is received by a slotted hole in the member 240, such that the fish attractant receiving structure 244 may be selectively interconnected to or removed from the other components of the diver 104.

The fish attractant receiving structure 244 can also include a biasing member 312. In accordance with embodiments of the present invention, when the retaining pin 308 is interconnected to the member 240 the biasing member is compressed between the member 240 and a stop 708, such as a bead or other structure, at or towards an end of the retaining pin opposite the retainer structure 704. The biasing member 312 may also function as a means for receiving a fish attracting substance. For example, where the biasing member 312 comprises a compression spring, fish attractant suspended in a petroleum jelly or in other forms may be loaded into the compression spring.

The fish attractant receiving structure 244 may also include an absorbent member 320. The absorbent member 320 may comprise a foam, sponge or other material suitable for holding a liquid fish attractant. In accordance with embodiments of the present invention, the absorbent member 320 may have a central bore that receives the retainer pin 308 and the biasing member 312, and may be held in place in the scent chamber 220 of the diver 104 between the stop 708 and the member 240.

Figure 8:
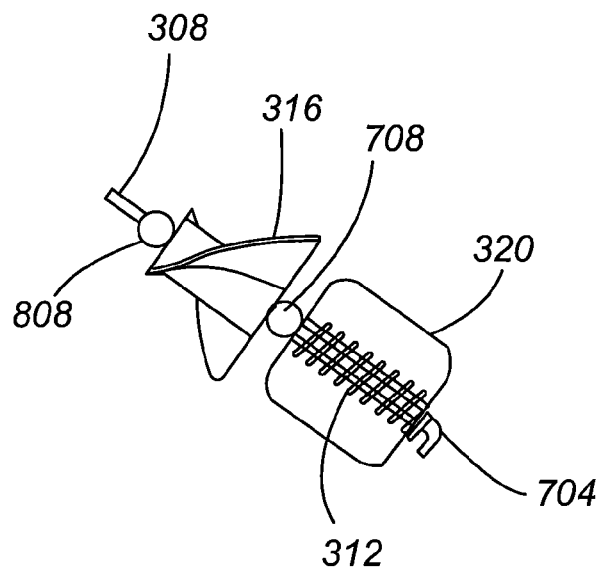
FIG. 8 is a cross-section of a scent retainer assembly in accordance with other embodiments of the present invention.

FIG. 8 illustrates a fish attractant receiving structure 244 in accordance with other embodiments of the present invention. In particular, a fish attractant receiving structure 244 is shown that includes a spinner 316. In general, the spinner 316 comprises a propeller-type device that is configured so that it spins as water moves relative to the diver 104, and in particular moves through the scent chamber 220. The spinner 316 may rotate about and be carried by the retainer pin 308, for example between the stop 708 and a spinner retainer structure or bead 808. By rotating when water passes over the diver 104, a stream of bubbles is produced, providing a means for attracting fish in addition or as an alternative to the fish attracting substance.

Figure 9:
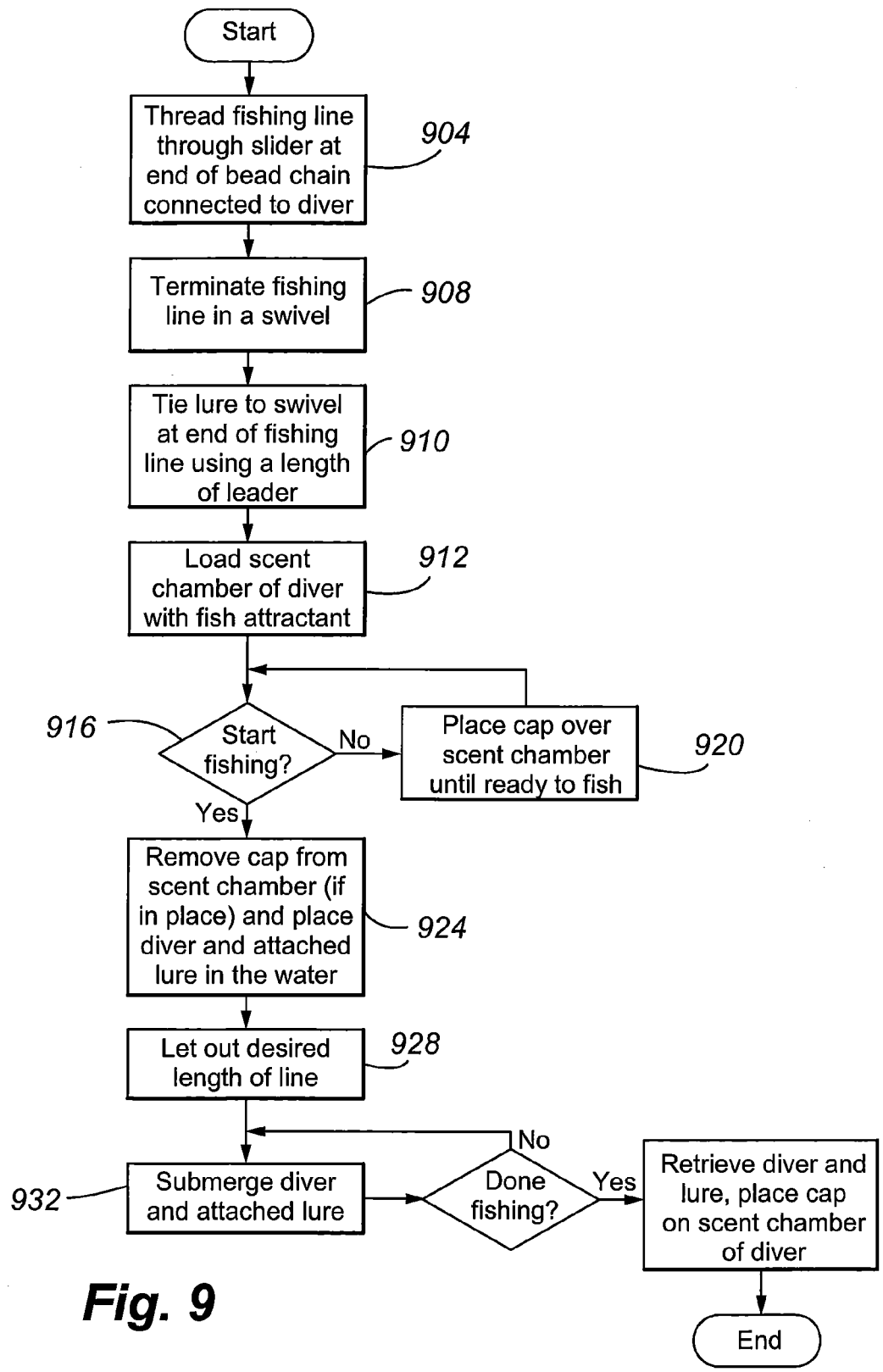
FIG. 9 is a flow chart depicting aspects of the method for fishing using a diver incorporating a scent chamber, in accordance with embodiments of the present invention.

Aspects of a method for fishing using a diver 104 incorporating a scent chamber 220 in accordance with embodiments of the present invention are illustrated in FIG. 9. Initially, the fishing line 120 is threaded through the slider 124 at the end of the bead chain 128 connected to the diver 104 (step 904). After threading the fishing line 120 through the slider 124, a barrel swivel 132 is interconnected to the free end of the fishing line (step 918). In accordance with embodiments of the present invention, the diver 104 may be provided with the slider 124, bead chain 128, swivel 132 and any other components for completing the rig 100 such that all of the components needed to fish with the rig 100 using a fishing line 120 connected to a rod and reel and a lure 112 are provided.

At step 908, a lure is tied to the swivel 132 at the end of the fishing line 120 using a length of leader 136. The scent chamber 220 of the diver 104 is then loaded with a fish attractant (step 912). This may comprise soaking an absorbent member 320 with a liquid fish attractant, or smearing a petroleum based fish attractant over an absorbent member 320 or other component of a fish attractant receiving structure 244, such as a biasing member 312. Examples of fish attractant suitable for use in connection with the diver 104 include Nitro Grease™ and Nitro Gravy™.

If it is determined at step 916 that fishing will not be started immediately, the scent chamber cap 604 may be placed over the scent chamber 220, to avoid having fish attractant leak from the diver 104 (step 920). Once fishing is to begin, the cap 604 is removed from the scent chamber 220 (if the cap 604 is in place on the scent chamber 220), and the diver 104 and the attached lure 112 are placed in the water (924).

At step 928, a desired length of line is let out. As can be appreciated by one of skill in the art, the diver 104 will remain at the surface of the water as long as the water is not moving relative to the diver 104. However, once water moves relative to the diver 104, the plane 208 acts to force the diver 104 beneath the surface. Accordingly, at step 932, the diver 104 is allowed or caused to move relative to the water, and the diver 104 and the attached lure 112 are submerged. As can also be appreciated by one of skill in the art, the depth that the diver 104 ultimately attains, together with the attached lure 112, depends on the speed of the diver 104 relative to the water, the size of the diver 104, the diameter of the fishing line 120, the size of the lure 112, and the amount of line between the rod tip and the diver 104. In addition, some adjustability of the attitude and/or depth of the diver 104 may be provided by the different attachment points 212 that can be included.

As can also be appreciated by one of skill in the art after consideration of the present disclosure, the position of the diver 104 relative to the lure 112 while the diver 104 and lure 112 are submerged allows scent or fish attractant to create a plume 118 in the water that generally travels around the lure 112. Accordingly, fish that follow the scent plume 118 will be drawn to the lure 112. Moreover, it can be appreciated that the scent chamber 220 inlet 224 and outlet 232 may be aligned so that, when the diver 104 is at its typical operational attitude (e.g. the angle of the diver 104 illustrated in FIG. 1), water passes through the scent chamber 220 relatively unimpeded. In addition, the bore 232 between the inlet 224 and the outlet 232 may be aligned so that a plume 118 of scent is directed at the lure 112. Similarly, where the scent chamber 220 incorporates a spinner 804 or other means for producing a trail of bubbles, those bubbles may be directed such that they pass around the lure, providing an additional attraction to fish.

Although embodiments of the present invention have described means for receiving a fish attracting substance comprising a scent chamber 220, it should be appreciated that structures other than an enclosure or chamber may be provided as part of a diver 104 for receiving a fish attracting substance. For example, a surface of the diver 104 may be textured for receiving a fish attracting substance and releasing that substance to create a plume that encompasses the lure 112. As an additional example, a biasing member 312 may be interconnected to the diver body 104 such that the biasing member is not within a structure 220 defining a volume, and the biasing member may be loaded with a fish attracting substance.

The foregoing discussion of the invention has been presented for purposes of illustration and description. Further, the description is not intended to limit the invention to the form disclosed herein. Consequently, variations and modifications commensurate with the above teaching, within the skill and knowledge of the relevant art, are within the scope of the present invention. The embodiments described hereinabove are further intended to explain the best mode presently known of practicing the invention and to enable others skilled in the art to utilize the invention in such or other embodiments and with various modifications required by their particular application or use of the invention. It is intended that the appended claims be construed to include the alternative embodiments to the extent permitted by the prior art.

What is claimed is:

1. A fishing diver device, comprising:
  a buoyant body having a longitudinal axis and first and second ends;
  a wing interconnected to the body, the wing having a bottom surface defining a plane that is parallel to the longitudinal axis of the buoyant body;
  means for attaching a fishing line to the device extending from a centerline of the wing and from said first end of the buoyant body,
  wherein said first and second ends of said buoyant body lie along the longitudinal axis of the buoyant body,
  wherein the means for attaching a fishing line defines a plane that is perpendicular to the plane defined by the bottom surface of the wing;
  means for receiving a fish attracting substance interconnected to and extending from said second end of the buoyant body, wherein said means for receiving a fish attracting substance has a longitudinal axis that is not parallel to the plane defined by the bottom surface of the wing and that is not parallel to the longitudinal axis of the buoyant body,
  wherein an angle between the longitudinal axis of the means for receiving a fish attracting substance and the plane defined by the bottom surface of the wing is fixed,
  wherein the means for receiving a fish attracting substance comprises a chamber having an inlet and an outlet, the inlet generally opening towards the second end of the buoyant body and the outlet generally opening away from the second end of the buoyant body,
  wherein the inlet and the outlet are aligned with one another such that the longitudinal axis of the means for receiving a fish attracting substance intersects the inlet and the outlet, wherein both the longitudinal axis of the means for receiving a fish attracting substance and the longitudinal axis of the buoyant body extend in a first plane that bisects the inlet to define first and second halves of the inlet and bisects the outlet to define first and second halves of the outlet, wherein said first and second halves of said inlet are symmetrical to one another;

wherein said first and second halves of said outlet are symmetrical to one another;

wherein an open area is located at the second end of the buoyant body, wherein the inlet of the means for receiving a fish attracting substance, is proximate the open area, wherein the outlet of the means for receiving a fish attracting substance is distal from the open area, and wherein the inlet of the means for receiving a fish attracting substance lies between the open area and the outlet of the means for receiving a fish attracting substance.

2. The device of claim 1, wherein a member extends across the inlet of the chamber of the means for receiving a fish attracting substance.

3. The device of claim 2, wherein the means for receiving a fish attracting substance further comprises a retaining pin, a retaining member, and a biasing member, wherein the retaining pin is interconnected to the member extending across the inlet of the chamber at a first end of the retaining pin, wherein the retaining member is at a second end of the retaining pin, and wherein the biasing member is held between the retaining member and the member extending across the inlet of the chamber.

4. The device of claim 3, wherein the means for receiving a fish attracting substance comprises an absorbent member received by the chamber having a central bore that receives the biasing member.

5. The device of claim 2, wherein the means for receiving a fish attracting substance comprises an absorbent member received by the chamber.

6. The device of claim 1, wherein the chamber includes a plurality of lateral ports between the inlet and the outlet.

7. The device of claim 1, wherein the open area includes a tapered surface such that the tapered surface leads directly into and is in communication with the inlet of the means for receiving a fish attracting substance.

8. A fishing device, comprising:
a diver body having a longitudinal axis extending between first and second ends of the diver body;
a wing interconnected to the diver body;
a line attachment point at or proximate to the first end of the diver body that is formed in a support structure interconnected to the diver body; and
a scent chamber extending from the second end of the diver body and having first and second lateral ports, a scent chamber inlet and a scent chamber outlet, and a central bore, wherein a longitudinal axis of the scent chamber extends between and intersects the scent chamber inlet and the scent chamber outlet,
wherein a first end of the scent chamber is directly connected to the second end of the diver body,
wherein the longitudinal axis of the scent chamber and the longitudinal axis of the diver body both lie within a first plane,
wherein the longitudinal axis of the scent chamber is not parallel to the longitudinal axis of the diver body,
wherein the longitudinal axis of the scent chamber is at a fixed angle with respect to the longitudinal axis of the diver body,
wherein the scent chamber inlet is intersected by the longitudinal axis of the diver body;
a sponge, wherein the sponge is received by the scent chamber; and
a cap, wherein the cap includes an end surface and a side surface defining a volume, wherein when the cap is placed on the scent chamber in an operative position, the volume encompasses at least a portion of the scent chamber such that the cap covers the scent chamber outlet and the first and second lateral ports of the scent chamber.

9. The device of claim 8, wherein the first and second lateral ports are on opposite sides of said scent chamber with at least a portion of said bore therebetween.

10. The device of claim 9, further comprising:
a retaining pin;
a retaining pin fixing bar spanning the inlet of the scent chamber, wherein said retaining pin is removably interconnected to the retaining pin fixing bar at a first end of the retaining pin.

11. The device of claim 10, further comprising:
a biasing member,
a retaining member, wherein the biasing member is generally coaxial to the retaining pin and is compressed between the retaining member at a second end of the retaining pin and the retaining pin fixing bar.

12. The device of claim 8, further comprising:
a tapered surface located at the second end of the diver body; wherein the tapered surface provides an open area that is in communication with the inlet of the scent chamber.

13. A fishing diver device, comprising:
a buoyant body having a longitudinal axis;
a wing interconnected to the body, the wing having a bottom surface defining a plane that is parallel to the longitudinal axis of the buoyant body;
means for attaching a fishing line to the device extending from a centerline of the wing and from a first end of the buoyant body, wherein the means for attaching a fishing line defines a plane that is perpendicular to the plane defined by the bottom surface of the wing;
means for receiving a fish attracting substance interconnected to a second end of the buoyant body, wherein said means for receiving a fish attracting substance has a longitudinal axis that is not parallel to the plane defined by the bottom surface of the wing, wherein the means for receiving a fish attracting substance comprises a chamber having an inlet and an outlet;
wherein a member extends across the inlet of the chamber of the means for receiving a fish attracting substance;
wherein the means for receiving a fish attracting substance further comprises a retainer pin, a retaining member, and a biasing member, wherein the retaining pin is interconnected to the member extending across the inlet of the chamber at a first end of the retaining pin, wherein the retaining member is at a second end of the retaining pin, and wherein the biasing member is held between the retaining member and the member extending across the inlet of the chamber; and
a spinner that is rotatable about an axis defined by the retaining pin.

14. A fishing diver device, comprising:
a buoyant body having a longitudinal axis;
a wing interconnected to the body, the wing having a bottom surface defining a plane that is parallel to the longitudinal axis of the buoyant body;

means for attaching a fishing line to the device extending from a centerline of the wing and from a first end of the buoyant body, wherein the means for attaching a fishing line defines a plane that is perpendicular to the plane defined by the bottom surface of the wing; and means for receiving a fish attracting substance interconnected to a second end of the buoyant body, wherein said means for receiving a fish attracting substance has a longitudinal axis that is not parallel to the plane defined by the bottom surface of the wing, wherein the means for receiving a fish attracting substance comprises a chamber having an inlet and an outlet;

wherein a member extends across the inlet of the chamber of the means for receiving a fish attracting substance;

wherein the means for receiving a fish attracting substance further comprises a retainer pin, a retaining member, and a biasing member, wherein the retaining pin is interconnected to the member extending across the inlet of the chamber at a first end of the retaining pin, wherein the retaining member is at a second end of the retaining pin, and wherein the biasing member is held between the retaining member and the member extending across the inlet of the chamber, wherein the retaining member comprises a retaining bead and the biasing member comprises a compression spring.

15. A fishing device, comprising:

a diver body;

a wing interconnected to the diver body;

a line attachment point at or proximate to a first end of and interconnected to the diver body;

a scent chamber having first and second ports that is interconnected to a second end of the diver body; wherein the scent chamber includes the first and second ports on opposite ends of said scent chamber with a bore therebetween;

a retaining pin;

a retaining pin fixing bar spanning the first port of the scent chamber, wherein said retaining pin is removably interconnected to the retaining pin fixing bar at a first end of the retaining pin;

a biasing member;

a retaining member, wherein the biasing member is generally coaxial to the retaining pin and is compressed between the retaining member at a second end of the retaining pin and the retaining pin fixing bar; and a sponge, wherein said sponge has a central bore that receives the retaining pin and the biasing member, and wherein the sponge is dimensioned to be received by the scent chamber.

16. A fishing diver device, comprising:

a buoyant body having a longitudinal axis and first and second ends which lie along the longitudinal axis of the buoyant body;

a wing interconnected to the body, the wing having a bottom surface defining a plane that is parallel to the longitudinal axis of the buoyant body;

means for attaching a fishing line to the device extending from a centerline of the wing and from the first end of the buoyant body, wherein the means for attaching a fishing line defines a plane that is perpendicular to the plane defined by the bottom surface of the wing;

means for receiving a fish attracting substance interconnected to and extending from the second end of the buoyant body, wherein said means for receiving a fish attracting substance has a longitudinal axis that is not parallel to the plane defined by the bottom surface of the wing and that is not parallel to the longitudinal axis of the buoyant body, wherein an angle between the longitudinal axis of the means for receiving a fish attracting substance and the plane defined by the bottom surface of the wing is fixed, wherein the means for receiving a fish attracting substance comprises a chamber having an inlet and an outlet, the inlet generally opening towards the second end of the buoyant body and the outlet generally opening away from the second end of the buoyant body, wherein an open area is located at the second end of the buoyant body, wherein the inlet of the means for receiving a fish attracting substance is proximate the open area;

wherein the outlet of the means for receiving a fish attracting substance is distal from the open area;

a fish attracting substance received by the means for receiving a fish attractant;

a length of bead chain interconnected to the means for attaching a fishing line at a first end and interconnected to a slider at a second end;

a fishing line terminated by a swivel, wherein the fishing line passes through the slider, and wherein the fishing line is thereby interconnected to the length of bead chain;

a length of leader interconnected to the swivel at a first end; and a lure interconnected to a second end of the leader, wherein when submerged and with water moving relative to the fishing diver device, the wing generates a force that pulls against the fishing line and that submerges the diver device, wherein the lure generally trails and is at a shallower depth than the means for receiving a fish attracting substance, and wherein the outlet of the means for receiving a fish attracting substance is pointed in the general direction of the lure.

* * * * *